United States Patent Office 3,328,420
Patented June 27, 1967

3,328,420
3,5-DIMETHYL-4-HALO-PYRAZOLES
Tomoyoshi Toyosato, Kyoto, Michihiko Ochiai, Suita, Hiroshi Hagimoto and Hiroshi Tamura, Kyoto, and Toshiya Kamikado, Suita, Japan, assignors to Takeda Chemical Industries, Ltd., Osaka, Japan
No Drawing. Original application Aug. 9, 1963, Ser. No. 301,201. Divided and this application Apr. 29, 1966, Ser. No. 560,919
Claims priority, application Japan, Aug. 10, 1962, 37/34,645
18 Claims. (Cl. 260—310)

This application is a division of application S.N. 301,-201, filed August 9, 1963.

The present invention relates to novel pyrazole derivatives and to their use for agricultural purposes. More particularly, the said pyrazole derivatives are those of the formula

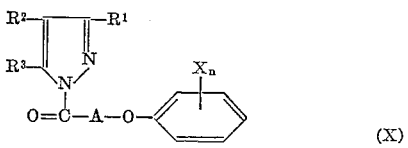

(X)

wherein $R^1$ stands for H, lower alkyl, lower aralkyl or aryl, $R^2$ stands for H, halogen, nitro, nitroso, cyano or lower alkoxycarbonyl, $R^3$ stands for H, OH, $NH_2$, lower alkyl, lower aralkyl, aryl or lower alkoxy, and $R^2$ and $R^3$ may form a benzene ring or a tetrahydrobenzene ring together with the carbon atoms in 4- and 5-positions of pyrazole ring, X stands for halogen, H, $NO_2$, lower alkyl, acyl, hydroxyalkyl, (lower)alkoxy(lower)alkyl or lower alkoxy. A stands for lower alkylene, and $n$ stands for an integer from 1 to 5, inclusive.

The pyrazole derivatives of the above-mentioned formula (I) have the effect to regulate growth of plants and, therefore, by a suitable choice of concentration of the pyrazole derivatives applied to plants and of the application method, the compounds regulate various growth phenomena of various plants, that is, leaf-expansion, shoot-elongation, root-initiation, fruit-development, fruit-ripening, flower-production and dormancy or, in the case of certain weeds, have a withering action.

There have been reported many kinds of plant growth regulators, but only a few of them are actually utilized for agricultural purposes, because most of them can not be used without risk of harm to desired cultural plants, or the agents are effective only to the non-intact plant, for example, to stem section, leaf disk or callus tissue, or a large amount of the agents is required, or the agents can not be applied to plants before rain or in rain.

Although many attempts have been made to overcome the aforesaid shortcomings and other disadvantages, none, as far as the present inventors are aware, has been entirely successful when applied to practical use.

The present invention provides a series of new pyrazole derivatives of the above-mentioned formula (I), having a remarkable plant growth regulating activity upon application of a small quantity of compound to plants, with no discernible change in activity even in the case of rain just after an application to plants.

It is an object of the present invention to provide plant growth regulators which are free from the above-mentioned shortcomings or disadvantages. Another object is to provide new pyrazole derivatives.

The present invention also contemplates providing methods for preparation of the said pyrazole derivatives. Among the further objects of the present invention is the provision of plant growth regulators which contain the pyrazole derivatives (I), and their use in regulating plant growth.

Other objects and advantages will become apparent from the following description taken in conjunction with the examples.

The pyrazole derivatives (I) of this invention can be synthesized through the reactions shown in the following reaction formulae:

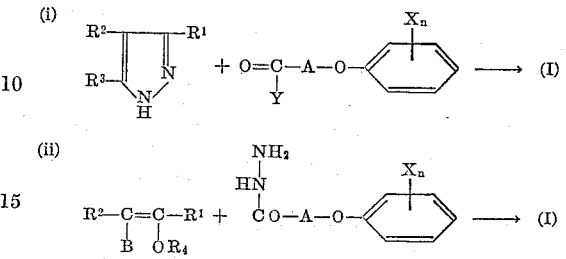

In the above-mentioned formulae, Y stands for a halogen, advantageously Cl, $R^4$ stands for H or lower alkyl, B stands for an acyl, a cyano, or an alkoxycarbonyl group, and $R^1$, $R^2$, $R^3$, X, $n$ and A have the same significance as those in the formula (I), respectively.

The alkyl group represented by $R^1$, $R^3$, $R^4$ or X in the foregoing formulae, is lower alkyl and may, for example, be methyl, ethyl, propyl, isopropyl, butyl or the like. As the halogen represented by $R^2$, X or Y there may be chlorine or bromine. The alkyl group as the constituent of the alkoxycarbonyl group represented by $R^2$ or B, the alkyl group as the constituent of the alkoxy group represented by $R^3$ or X, and the alkyl group as the constituent of hydroxyalkyl or alkoxy—alkyl represented by X in the formulae are likewise lower alkyl (cf. first sentence of the present paragraph).

When the compounds have two or more alkyl groups respectively represented by $R^1$, $R^3$ or $R^4$, they may be the same as or different from each other. In case the number $n$ is greater than 1, each X may be the same as or different from every other X.

Among the acyl groups represented by X or B in the above formulae, there may, for example, be included the formyl, acetyl and benzoyl groups, and among the aralkyl groups represented by $R^1$ or $R^3$ there may, for example, be included benzyl and phenethyl groups.

The aryl group represented by $R^1$ or $R^3$ may, for example, be phenyl or substituted phenyl. The alkylene group represented by A may be a straight or branched chain; for example, it may be methylene, ethylene, trimethylene, tetramethylene, pentamethylene, ethylidene, 1-methylethylene, 2-methylethylene, 1-methylpropylene, or 2-ethylethylene. Furthermore, $R^2$ and $R^3$ may form a benzene ring or a tetrahydrobenzene ring together with the carbon atoms in 4- and 5-positions of the pyrazole ring.

As previously described, the pyrazole derivatives of the present invention may be provided by the reactions as shown in the above-mentioned reaction formulae (i) or (ii).

The reaction (i) may be carried out in the presence or absence of a suitable solvent. As solvent, there may be used such organic bases as pyridine, triethylamine, dimethylaniline or the usual organic solvents such as acetone, methylethylketone, dimethylformamide, etc. The reaction is generally effected at room temperature (15° to 30° C.), and it may be controlled by heating or cooling, if necessary.

The reaction (ii) may be carried out in a suitable solvent. The solvent may, for example, be water, methanol, ethanol, acetic acid, benzene, etc., or a mixture consisting of two or more of these solvents. The reaction may be promoted by the addition of a small amount of acid to the reaction system. The reaction may be effected at room temperature and may also be controlled by heating or cooling, if necessary.

The following list sets forth a wide variety of pyrazole derivatives prepared by the method of the present invention, which are useful as plant growth regulators according to the present invention:

(1) 1 - (2,3,6 - trichlorophenoxyacetyl) - 3,5-dimethyl-4-chloropyrazole;

(2) 1 - (2,4 - dinitrophenoxyacetyl) - 3,5-dimethyl-4-bromopyrazole;

(3) 1 - (2,4 - dinitrophenoxyacetyl) - 3,5 - dimethyl-4-chloropyrazole;

(4) 1 - (2 - ethylphenoxyacetyl) - 3,5-di(p-nitrophenyl)-4-bromopyrazole;

(5) 1 - (2 - formyl - 4 - chlorophenoxyacetyl)-3,5-dimethyl-4-chloropyrazole;

(6) 1 - (2 - formyl - 4 - chlorophenoxyacetyl)-3,5-dimethyl-4-bromopyrazole;

(7) 1 - (2,3,6 - trichlorophenoxyacetyl) - 3,5-dimethyl-4-bromopyrazole;

(8) 1 - (2,3,6 - trichlorophenoxyacetyl) - 3,5-diethyl-4-chloropyrazole;

(9) 1 - (3 - methoxyphenoxyacetyl) - 3,5-dimethyl-4-chloropyrazole;

(10) 1 - (2 - chlorophenoxyacetyl) - 3,5-dimethyl-4-chloropyrazole;

(11) 1-(2 - hydroxymethyl - 4 - chlorophenoxyacetyl)-3,5-dimethyl-4-chloropyrazole;

(12) 1-(2,4-dinitrophenoxyacetyl) - 3,5 - diethyl-4-bromopyrazole.

In practice, and to realize the desired activity, the plant growth regulators of the present invention are advantageously applied to plants in the form of the compositions such as dust, emulsion, suspension or solution. In other words, the plant growth regulator compositions of the present invention comprise essentially at least one active compound (pyrazole derivative) represented by the above-mentioned formula (I) together with a suitable carrier (e.g. extender and/or conditioning agent) of the type commonly employed for the carriers of a known growth control agent. It is not intended, in this respect, that the present invention be limited to any specific proportions of active ingredient(s) (I) and adjuvant.

The compositions may be readily prepared ab initio or may e.g. be in the form of concentrates comprising active ingredient (I) with only a minor amount of an adjuvant, e.g. a surface active agent. Such a concentrate is economical as regards transportation, storage and the like, and may easily be admixed—prior to use—with additional adjuvant to give the desired concentration of the active ingredient when it is applied. The adjuvant may be selected depending on plants to be treated, properties of active ingredient and other adjuvant to be used together, and conditions of use.

Thus, if both the active ingredient and adjuvant(s) are water-soluble, the composition may be applied in the form of an aqueous spray. If, for example, a water insoluble adjuvant is employed—e.g. if the composition comprises a water-insoluble adjuvant—the composition may be applied as an aqueous dispersion. It is also possible e.g. merely to mix the active agent, in powder form, with a powdery adjuvant and to use the mixture (dust). Or, the powder mixture may be suspended in water or in an oil, such as gasoline, kerosene, etc., which, upon mixing with water, forms e.g. an oil-in-water emulsion containing the active ingredient. When the compositions are used in dust form, the adjuvant (or diluent) may e.g. be talc, clay, diatomaceous earth, lime, calcium sulfate, kaolin and the like.

When the compositions are used in the form of liquid, the adjuvant (diluent) is e.g. water, an aqueous solvent, a volatile or non-volatile organic solvent, e.g. an alcohol such as methanol, ethanol, etc., a ketone such as acetone, methylethylketone, etc., an ether such as dioxane, tetrahydrofuran, etc., an aromatic hydrocarbon such as benzene, toluene, xylene, etc., a halogenated hydrocarbon such as chloroform, carbon tetrachloride, etc., an ester such as ethyl acetate and oil, etc. the composition—as aforeindicated—taking the form of a solution, emulsion or suspension depending on the nature of the materials employed.

The new plant growth regulating compositions may further contain wetting agents, dispersing agent and emulsifiers such as suitable surface active agents, e.g. polyoxethyleneglycolethers, polyoxyethyleneglycolesters, polyoxyethylene derivatives of sorbitan monolaurate (monooleate, monostearate), polyoxyethylenealkylarylether, alkyl sulfonate, alkylaryl sulfonate, alkyl sulfosuccinate, etc. They may also contain adherent or sticking agents, and also other agricultural chemicals, e.g. pesticides, fungicides, manure or fertilizer growth controlling agents, plants hormone, etc., all these materials being considered "adjuvants."

It is within the scope of the present invention to employ other adjuvants than those hereinbefore mentioned—e.g. solid or liquid diluents, emulsifiers, dispersants, surface active agents or otherwise—those already mentioned being merely illustrative.

The essence of the present invention does not reside in any specific adjuvant but in a composition consisting essentially of at least one compound of the formula (I) and an appropriate inert agricultural adjuvant which does not prejudice the activity of the composition.

Generally speaking, an effective amount for plant growth regulation is satisfied with the following quantitative relationships.

A dust or oil composition for direct application to plants may contain from 0.00001 percent to 10 percent or more of the active ingredient(s) by weight. When the composition is prepared for actual use in the form of sprays or more dilute dusts, the content of the active ingredient(s) may vary from about 0.01 percent to as high as 0.1 percent by weight, the balance of the composition being one of the diluents and/or surface active agents (adjuvants) previously mentioned.

Content of the active ingredient in an aqueous dispersion may similarly vary from a very low percentage, e.g. 1 percent by weight, where the dispersion is applied directly to plants, to a relatively high percentage, e.g. 90 percent by weight, where the dispersion is employed as a concentrate, the balance in each case being constituted by an adjuvant or adjuvants.

The plant growth regulators of the present invention promote leaf-expansion, shoot-elongation, root-initiation, fruit-set, fruit-development, fruit-ripening, flower-production or break dormancy of plant (bud or seed), or induce parthenocarpy, or inhibit absciss-layer formation at a considerable low concentration and inhibit growth or kill weeds at a considerable high concentration.

Among these uses of the present plant growth regulators effects on the regulation of fruit-development, i.e. effects on inducing parthenocarpy, inhibition of absciss-layer formation, fruit-drop prevention, stimulation of fruit-development, stimulation of fruit-ripening, and effect on suppressing or withering weeds are very prominent.

Heretofore, p-chlorophenoxy acetic acid, β-naphthoxy acetic acid, 2,4-dichlorophenoxy acetic acid, 2,4,5-trichlorophenoxypropionic acid, α-naphthalenacetic acid or a mixture of two or three of these have been put to use for fruit-drop prevention or fruit-set stimulation, expecting their "hormonal effect." These known compounds, however, are not free from the shortcomings that a large amount of the agents must be applied, or that the agents may do auxonic (hormonal) injury to plants to which they are applied.

The plant growth regulators of the present invention, on the other hand, display a superior "hormonal effect" on plants in spite of the application of a lesser amount in comparison with the above-mentioned compounds or their mixtures.

In application of the plant growth regulator of the present invention to plants for the purpose of growth promotion of the plants, it can be applied or sprayed onto seeds, roots, sprouts, stems, leaves, flowers, flower clusters, fruits, etc., in a suitable concentration for the purposes.

In application of the plant growth regulator of the present invention to plants for the purpose of growth inhibition of the plants or weeds, it can be applied to soil in pre-emergence of the plants or in post-emergence in a suitable concentration for the purpose.

In the treatment of paddy field weeds, the plant growth regulator may directly be applied to the plants or in paddy field where the plants grow. The plant growth regulator of the present invention can cause contact and auxonic (hormonal) injury, growth inhibition or withering of weeds by direct or indirect contact therewith, and moreover, the plant growth regulator displays inter-genus-selectivity among gramineous plants.

Examples of regulative effect upon plant growth by application of the pyrazole derivatives (I) are set forth as follows:

EXAMPLE A

*Growth promotion test*

Growth-promoting and inhibiting action of the present compounds were tested by the *Avena* straight growth method. Ten pieces of 5 millimeter length of subapical section of *Avena* coleoptiles were soaked in the solution for 24 hours at 25° C. in the dark and their lengths were measured under the travelling microscope.

In the table, the compounds are represented by the corresponding numbers shown below:

1-(2,4-dichlorophenoxyacetyl) - 3,5 - dimethylpyrazole _____ I
1-(4-chlorophenoxyacetyl)-3,5-dimethylpyrazole __ II
1-(2,3,6-trichlorophenoxyacetyl) - 3,5 - dimethyl-4-chloropyrazole _____ III
1-(2,4-dichlorophenoxyacetyl) - 3 - methyl-5-phenylpyrazole _____ IV
1-(2,4,5 - trichlorophenoxyacetyl) - 3,5 - dimethylpyrazole _____ V
1-[α - (2,4-dichlorophenoxy)propionyl] - 3,5 - dimethylpyrazole _____ VI
1-(2,4-dichlorophenoxyacetyl)indazole _____ VII
1-(2-hydroxymethyl - 4 - chlorophenoxy-acetyl)-3,5-dimethylpyrazole _____ VIII
1-(2,4,5-trichlorophenoxyacetyl) - 4,5,6,7 - hexahydroindazole _____ IX

TABLE.—MEAN VALUE OF TEN SECTIONS

| Concentration (p.p.m.[1]) | Section length (milliliter) | | | | |
|---|---|---|---|---|---|
| | 0 | 0.1 | 1 | 10 | 100 |
| Tested Compound: | | | | | |
| I | 5.87 | 6.83 | 7.42 | 5.86 | 5.07 |
| II | | 6.74 | 7.38 | 5.70 | 5.02 |
| III | | 6.82 | 7.40 | 5.81 | 5.08 |
| IV | | 6.51 | 6.98 | 6.01 | 5.78 |
| V | | 6.04 | 6.27 | 6.13 | 5.96 |
| VI | | 5.94 | 6.08 | 6.23 | 6.14 |
| VII | | 6.43 | 7.10 | 5.74 | 5.19 |
| VIII | | 6.24 | 6.73 | 6.15 | 5.75 |
| IX | | 6.32 | 6.79 | 6.04 | 5.55 |

[1] p.p.m. means concentrations in parts per million.

EXAMPLE B

*Fruit-set and fruit-development test*

(1) *Conditions*

Tested plant: Tomato (*Lycopersicon esculentum* Mill)

Test scale: 20 pots (1/2000 are Wagner's pot) per one plat, per one plant per one pot, 2 repetitions The term "plot" used in following examples means a definite treated area of experiment in which the preparation of this invention is applied, in other words, for example, "20 pots 1 plot" used in Example B has such a meaning that the preparation of this invention having a certain concentration is applied to 20 pots, respectively. This is applicable to the same term used in all other examples.

Method: Respective aqueous solutions each containing one of the following six compounds in various concentration are applied to the flowers with a brush, and days required for ripening and the features of fruit-set and fruit-development were observed.

(2) *Result*

In the following two tables, the compounds are represented by the corresponding numbers shown below:

1 - (2,4 - dichlorophenoxyacetyl)-3,5-dimethylpyrazole _____ I
1-(4-chlorophenoxyacetyl)-3,5-dimethylpyrazole ___ II
1 - (2,4,5 - trichlorophenoxyacetyl)-3,5-dimethyl-4-chloropyrazole _____ III
1 - (2 - formyl-4-chlorophenoxyacetyl)-3,5-dimethylpyrazole _____ IV
1 - (2 - formyl-4-chlorophenoxyacetyl)-3,5-dimethyl-4-chloropyrazole _____ V
1 - (2 - formyl-4-chlorophenoxyacetyl)-3-methyl-5-phenylpyrazole _____ VI

TABLE I

| Compounds | Conc.,[1] p.p.m.[2] | Percentage of fruit-set (percent) | Fruit-development (millimeter) | | Average weight of treated fruit in the harvest time (grams) | Days required for ripening (days) |
|---|---|---|---|---|---|---|
| | | | Mean value of diameter of fruits 14 days after the application | Mean value of diameter of fruit in the harvest time | | |
| Control (water) | 0 | 48.3 | 27 x 27 | 54 x 43 | 128.2 | 40.3 |
| I | 1 | 77.2 | 31 x 31 | 58 x 48 | 137.4 | 36.5 |
| | 10 | 96.1 | 39 x 36 | 67 x 51 | 145.6 | 32.3 |
| | 20 | 87.7 | 35 x 35 | 65 x 51 | 140.9 | 33.1 |
| | 40 | 85.4 | 37 x 31 | 64 x 51 | 140.2 | 33.4 |
| II | 1 | 53.7 | 27 x 27 | 54 x 43 | 127.7 | 39.2 |
| | 10 | 57.6 | 30 x 28 | 54 x 45 | 129.1 | 37.1 |
| | 20 | 59.3 | 32 x 31 | 54 x 46 | 128.9 | 37.1 |
| | 40 | 60.1 | 33 x 30 | 56 x 49 | 132.5 | 35.9 |
| III | 1 | 51.6 | 28 x 27 | 54 x 46 | 128.3 | 39.2 |
| | 10 | 57.4 | 29 x 27 | 56 x 47 | 128.0 | 38.7 |
| | 20 | 58.7 | 30 x 28 | 56 x 47 | 129.2 | 37.1 |
| | 40 | 63.5 | 32 x 31 | 58 x 48 | 132.6 | 35.8 |

[1] Conc. means concentration. [2] p.p.m. means parts per million.

TABLE II

| Compounds | Conc.,[1] p.p.m.[2] | Percentage of fruit-set | Fruit-development (average weight of treated fruit in the harvest time) (gram) | Days required for ripening (day) |
|---|---|---|---|---|
| Control (water) | 0 | 47.2 | 126.0 | 40.3 |
| IV | 1 | 51.2 | 128.6 | 37.5 |
|  | 10 | 75.3 | 137.1 | 32.3 |
|  | 40 | 86.4 | 145.2 | 33.4 |
|  | 100 | 80.3 | 139.0 | 35.6 |
| V | 10 | 67.2 | 129.1 | 37.3 |
|  | 20 | 80.3 | 139.6 | 36.3 |
|  | 40 | 84.1 | 141.3 | 35.2 |
|  | 100 | 70.3 | 132.6 | 37.0 |
| VI | 10 | 51.6 | 130.1 | 38.5 |
|  | 20 | 55.4 | 132.5 | 38.0 |
|  | 40 | 60.3 | 135.3 | 36.5 |
|  | 100 | 57.2 | 136.4 | 37.8 |

[1] Conc. means concentration.
[2] p.p.m. means parts per million.

EXAMPLE C

*Fruit-set promotion test*

(1) *Conditions*

Tested plants: Egg plant (*Solanus melongena*)
Test scale: one plant per one pot; 20 pots (1/2000 are Wagner's pot) per 1 plot, 2 repetitions Method: The solutions of the following four compounds are applied to flowers and peduncles with a brush.

(2) *Result*

In the following table, the compounds are represented by the corresponding numbers shown below:

1 - (2,4 - dichlorophenoxyacetyl)-3,5-dimethylpyrazole ............................................. I
1-(4-chlorophenoxyacetyl)-3,5-dimethylpyrazole .... II
1 - (2,4,5 - trichlorophenoxyacetyl)-3,5-dimethyl-4-chloropyrazole ............................... III
1 - (2,4 - dichlorophenoxyacetyl)-3,5-dimethyl-4-nitropyrazole ..................................... IV

| Compounds | Concentration (p.p.m.[1]) | Percentage of fruit-set |
|---|---|---|
| I | 10 | 100 |
|  | 20 | 100 |
|  | 30 | 100 |
|  | 40 | 100 |
| II | 10 | 100 |
|  | 20 | 95 |
|  | 30 | 100 |
|  | 40 | 100 |
| III | 10 | 90 |
|  | 20 | 95 |
|  | 30 | 95 |
|  | 40 | 95 |
| IV | 10 | 100 |
|  | 20 | 100 |
|  | 30 | 100 |
|  | 40 | 100 |
| Control (water) | | 66 |

[1] p.p.m. means concentrations in parts per million.

EXAMPLE D

*Growth inhibition test of young stage plants*

(1) *Conditions*

Tested plants: Rice (*Oryza sativa* L.), Cucumber (*Cucumis sativus* L.) and Cocks foot (*Panicum crusgalli* L.)
Test scale: 10 seeds per one plot. 3 repetitions
Method: Germinating seeds of equal state of germination are placed in a petri-dish (diameter: 9 cm.) on which filter paper is spread and respective 5 cubic centimeters of the suspensions of each containing one of the following compounds are poured. Then they are incubated at 25° C. in the dark.

(2) *Result*

Five days after treatment, root length and stem length are respectively measured to calculate inhibition percentages.

$$\text{Inhibition percentage} = \left(1 - \frac{\text{treated root length (treated stem length)}}{\text{non-treated root length (non-treated stem length)}}\right) \times 100$$

| | | Plant | | | | | |
|---|---|---|---|---|---|---|---|
| | | Rice (*Oryza sativa* L.) | | Cucumber (*Cucumis sativus* L.) | | Cocks foot (*Panicum crusgalli* L.) | |
| | p.p.m.[1] | Inhibition Percentage (Percent) | | | | | |
| | | root length | stem length | root length | stem length | root length | stem length |
| 1-(4-chloro-phenoxyacetyl)-3,5-dimethyl-pyrazole | 1 | 95 | 5 | 90 | 0 | 90 | 62 |
| | 10 | 95 | 0 | 100 | 20 | 93 | 91 |
| | 100 | 93 | 0 | 100 | 38 | 93 | 93 |
| 1-(2,4-dichlorophenoxyacetyl)-3,5-dimethyl-pyrazole | 1 | 100 | 0 | 100 | 57.9 | 84.5 | 49.6 |
| | 10 | 100 | 53.6 | 97.0 | 0 | 84.7 | 61.4 |
| | 100 | 100 | 100 | 100 | 0 | 88.5 | 66.3 |

[1] p.p.m. means parts per million.

EXAMPLE E

*Growth inhibition and withering test by spray method at post-emergence*

(1) *Conditions*

Test plants: Rice, Soybean (*Glycine max* Merrill), Buck wheat (*Fagopyrum esculentum* Moench) and Tomato (*Lycopersicon esculentum* Mill)
Test scale: 1 plot (1/5000 are Wagner's pot) per 1 plot, 10 plants per one plot, 2 repetitions
Method: Respective 10 cubic centimeters of the emulsions each containing one of the following three compounds are sprayed at 3–4 leaves stage (2) *Observation*

Fourteen days after treatment, results are examined to calculate inhibition percentages and withering percentages.

$$\text{Inhibition percentage} = \left(1 - \frac{\text{Fresh weight at treated plot}}{\text{Fresh weight at non-treated plot}}\right) \times 100 \ (\%)$$

$$\text{Withering percentage} = \frac{\text{Number of completely withered plant}}{\text{Number of used test plant}} \times 100 \ (\%)$$

(3) Result

In the following table, the compounds are represented by the corresponding numbers shown below.

1 - (2,4-dichlorophenoxyacetyl)-3,5-dimethylpyrazole — I
1 - (2 - formyl-4-chlorophenoxyacetyl)-3,5-dimethyl-4 - chloropyrazole — II
1 - β - (2-hydroxymethyl-4-chlorophenoxy)propionyl-3,5-dimethyl-4-nitrosopyrazole — III
1 - (4 - chloro-2-methylphenoxyacetyl)-3,5-dimethylpyrazole — I
1 - (2,4,5 - trichlorophenoxyacetyl)-3,5-dimethylpyrazole — II
1 - (4-chlorophenoxyacetyl)-3,5-dimethyl-4-chloropyrazole — III
1 - (2,4 - dichlorophenoxyacetyl) - 3,5 - dimethyl-4-chloropyrazole — IV

TABLE

| Compounds | Concentration (Percent) | Rice | | Soy beans | | Tomato | | Buck wheat | |
|---|---|---|---|---|---|---|---|---|---|
| | | Inhibition (Percent) | Withering (Percent) | Inhibition (Percent) | Withering (Percent) | Inhibition (Percent) | Withering (Percent) | Inhibition (Percent) | Withering (Percent) |
| I | 0.03 | 0 | 0 | 20 | 0 | 43 | 10 | 34 | 0 |
|   | 0.05 | 10 | 0 | 78 | 32 | 100 | 100 | 100 | 100 |
| II | 0.03 | 3 | 0 | 34 | 0 | 68 | 20 | 45 | 12 |
|   | 0.05 | 14 | 0 | 82 | 44 | 100 | 100 | 100 | 100 |
| III | 0.03 | 5 | 0 | 22 | 0 | 44 | 10 | 30 | 0 |
|   | 0.05 | 17 | 0 | 87 | 40 | 100 | 100 | 100 | 100 |

Concentrations in the present example are shown by weight-percentage.

EXAMPLE F

*Growth inhibition test and withering test by an application to soil at pre-emergence*

(1) Conditions

Tested plants: Rice, soy bean, buck wheat and tomato
Test scale: 1 pot (1/5000 are Wagner's pot) per 1 plot, about 10 plants per pot, 2 repetitions.
Method: Respective 10 cubic centimeters of the solutions of the following compounds per one plot is applied to soil at pre-emergence.

1 - (2,4,5 - trichlorophenoxyaceyl) - 3,5 - dimethyl-4 - chloropyrazole — V
1 - (2 - chlorophenoxyacetyl) - 3 - chloromethyl-4-nitrosopyrazole — VI
1 - (2,4-dichlorophenoxyacetyl) - 3,5 - dimethyl-4-nitropyrazole — VII
1 - (4 - chlorophenoxyacetyl) - 3,5 - dimethylpyrazole — VIII
1 - (2,4-dichlorophenoxyacetyl) - 3,5 - dimethylpyrazole — IX

(2) Result

One month after treatment, the result is examined to calculate inhibition percentages and withering percentages. Inhibition percentages and withering percentages have the same meaning as those defined in Example E.

In the following table, the compounds are represented by the corresponding numbers shown below.

| Compounds | Concentration (Percent) | Rice | | Soy bean | | Tomato | | Buck wheat | |
|---|---|---|---|---|---|---|---|---|---|
| | | Inhibition (Percent) | Withering (Percent) | Inhibition (Percent) | Withering (Percent) | Inhibition (Percent) | Withering (Percent) | Inhibition (Percent) | Withering (Percent) |
| I | 0.05 | 7.1 | 0 | 44.5 | 0 | 23.1 | 0 | 39.3 | 0 |
|   | 0.1 | 36.4 | 0 | 73.8 | 33.4 | 57.7 | 25.0 | 100 | 100 |
|   | 0.5 | 36.4 | 0 | 100 | 100 | 100 | 100 | 87.5 | 75 |
| II | 0.05 | 0 | 0 | 80.9 | 66.7 | 11.6 | 0 | 25.0 | 25.0 |
|   | 0.1 | 0 | 0 | 83.9 | 66.7 | 46.2 | 0 | 0 | 0 |
|   | 0.5 | 9.1 | 0 | 100 | 100 | 77.0 | 58.0 | 26.8 | 25.0 |
| III | 0.05 | 27.3 | 0 | 100 | 100 | 0 | 0 | 0 | 0 |
|   | 0.01 | 27.3 | 0 | 74.8 | 66.7 | 11.6 | 0 | 0 | 0 |
|   | 0.5 | 0 | 0 | 100 | 100 | 53.9 | 25.0 | 10.8 | 0 |
| IV | 0.05 | 18.2 | 0 | 100 | 100 | 73.1 | 50.0 | 39.3 | 25.0 |
|   | 0.1 | 0 | 0 | 100 | 100 | 100 | 100 | 12.5 | 0 |
|   | 0.5 | 0 | 0 | 100 | 100 | 100 | 100 | 100 | 100 |
| V | 0.05 | 27.3 | 0 | 100 | 100 | 88.8 | 75.0 | 51.8 | 25.0 |
|   | 0.1 | 18.2 | 0 | 100 | 100 | 100 | 100 | 87.5 | 75.0 |
|   | 0.5 | 27.3 | 0 | 100 | 100 | 100 | 100 | 100 | 100 |
| VI | 0.05 | 0 | 0 | 21.6 | 0 | 0 | 0 | 0 | 0 |
|   | 0.1 | 0 | 0 | 18.2 | 0 | 13.4 | 0 | 16.4 | 0 |
|   | 0.5 | 0 | 0 | 100 | 100 | 90.0 | 60 | 20.5 | 0 |
| VII | 0.05 | 0 | 0 | 10.3 | 0 | 100 | 100 | 20.5 | 0 |
|   | 0.1 | 0 | 0 | 22.8 | 0 | 100 | 100 | 26.6 | 0 |
|   | 0.5 | 50 | 0 | 100 | 100 | 100 | 100 | 100 | 100 |
| VIII | 0.1 | 0 | 0 | 100 | 100 | 100 | 100 | 76.0 | 60 |
|   | 0.5 | 0 | 0 | 100 | 100 | 100 | 100 | 86.8 | 60 |
|   | 1.0 | 40 | 0 | 100 | 100 | 100 | 100 | 100 | 100 |
|   | 2.0 | 40 | 0 | 100 | 100 | 100 | 100 | 100 | 100 |
| IX | 0.1 | 0 | 0 | 35.3 | 0 | 71.2 | 50 | 64.0 | 38 |
|   | 0.5 | 0 | 0 | 85.0 | 50 | 96.2 | 75 | 88.2 | 50 |
|   | 1.0 | 40 | 0 | 100 | 100 | 100 | 100 | 100 | 100 |
|   | 2.0 | 80 | 15 | 100 | 100 | 100 | 100 | 100 | 100 |

Concentrations in the present example are shown by weight-percentage.

EXAMPLE G

*Test for Fruit-drop Prevention*

(1) Condition

Test plant: Apple (*Malus pumile* Mill var *dulcissima* Koidz)
Method: Solutions of various concentrations containing 1 - (2,4-dichlorophenoxyacetyl-3,5-dimethylpyrazole are applied to fruits and fruit-stalks about one month before the harvest time, and the difference in the number of dropped fruits between treated trees and non-treated ones is observed.

(2) *Result*

|  | Concentration (parts per million) | Number of treated fruits | Number of dropped fruits | Percentage of dropped fruits |
|---|---|---|---|---|
| Treated | 4.9 | 30 | 9 | 30 |
|  | 9.7 | 30 | 3 | 10 |
|  | 19.4 | 30 | 7 | 23 |
|  | 38.8 | 30 | 8 | 27 |
| Nontreated |  | 30 | 11 | 37 |

For the purpose of giving those skilled in the art a better understanding of the present invention, the following illustrative examples of presently-preferred embodiments of pyrazole derivatives and of the compositions of preparations containing pyrazole derivatives. In these examples, parts and percentages are by weight.

EXAMPLE 1

An emulsion comprising 0.1 part of 1-(4-chlorophenoxyacetyl)-3,5-dimethylpyrazole, 0.3 part of polyoxyethylenesorbitane monolaurate, 50 parts of acetone and 49.6 parts of benzene, according to the invention, is useful in promoting fruit-set and fruit-ripening.

EXAMPLE 2

A solution comprising 0.2 part of 1-(2,4-dichlorophenoxyacetyl)-3,5-dimethylpyrazole, 0.8 part of polyoxyethylenealkylarylether and 99 parts of acetone, according to the invention, is useful in promoting fruit-set and fruit-development.

EXAMPLE 3

An emulsion comprising 0.5 part of 1-(2,4-dichlorophenoxyacetyl)-3,5-dimethyl-4-chloropyrazole, 1.5 part of polyoxyethylenesorbitane monolaurate and 98 parts of methylnaphthalene, according to the invention, is useful in promoting fruit-set and fruit-development.

EXAMPLE 4

A tablet comprising 0.1 part of 1-(2,4-dichlorophenoxyacetyl)-3,5-dimethylpyrazole in 97 parts of lactose, 10 parts of polyethylene glycol (5% methanol solution), 1.2 part of starch, and 1.2 part of talc, according to the invention, is useful in promoting fruit-set and fruit-development.

EXAMPLE 5

A tablet comprising 0.2 part of 1-(2,4,5-trichlorophenoxyacetyl)-3,5-dimethylpyrazole in 96.9 parts of lactose, 10 parts of polyethylene glycol (5% methanol solution), 1.2 part of starch and 1.2 part of talc, according to the invention, is useful in promoting fruit-ripening.

EXAMPLE 6

A powder comprising 2 parts of 1-(4-chlorophenoxyacetyl)-3,5-dimethylpyrazole and 98 parts of talc, according to the invention, is useful in promoting root-initiation.

EXAMPLE 7

A wetting powder comprising 20 parts of 1-(2,4-dichlorophenoxyacetyl)-3,5-dimethylpyrazole, 4 parts of sodium ligninsulfonate, 4 parts of polyoxyethylenealkylarylether and 72 parts of clay, according to the invention, is useful in withering weeds.

EXAMPLE 8

An emulsion comprising 20 parts of 1-(2,4-dinitrophenoxyacetyl)-3,5-dimethyl-4-chloropyrazole, 10 parts of methylnaphthalene, according to the invention, is useful in withering weeds.

EXAMPLE 9

A granule comprising 2 parts of 1-(2,4-dichlorophenoxyacetyl)3,5-dimethylpyrazole and 98 parts of bentonite, according to the invention, is useful in withering weeds.

The following examples set forth presently-preferred exemplary embodiments of the preparation of compounds (I).

EXAMPLE 10

To a mixture of 20 parts of ethanol and 5 parts of water are added 2 parts of 4-chlorophenoxyacethydrazide, 1 part of acetylacetone and 0.3 part of 10% hydrochloric acid, and the mixture is refluxed for 2 hours. After cooling, the separated crystals are recrystallized from ethanol to give 1-(4-chlorophenoxyacetyl)-3,5-dimethylpyrazole as colorless scales melting at 112–113° C. Yield 2 parts.

*Analysis.*—Calculated: C, 58.98%; H, 4.95%; N, 10.58%.
  Found: C, 59.14%; H, 4.82%; N, 10.32%.

EXAMPLE 11

To 30 parts of ethanol are added 2.3 parts of 2,4-dichlorophenoxyacethydrazide, 1 part of acetylacetone, and 0.3 part of 10% hydrochloric acid, and the mixture is refluxed for 1.5 hours. After cooling, the separated crystals are recrystallized from ethanol to give 1-(2,4-dichlorophenoxyacetyl)-3,5-dimethylpyrazole as colorless needles melting at 132–134° C. Yield 2.5 parts.

*Analysis.*—Calculated: C, 52.19%; H, 4.04%; N, 9.36%.
  Found: C, 52.40%; H, 4.25%; N, 9.29%.

EXAMPLE 12

To a mixture of 20 parts of ethanol and 10 parts of water are added 2 parts of 2-chlorophenoxyacethydrazide, 1 part of acetylacetone and 0.3 part of 10% hydrochloric acid, and the mixture is allowed to react at 50° C. for 6 hours. After cooling, the separated crystals are recrystallized from ethanol to give 1-(2-chlorophenoxyacetyl)3,5-dimethylpyrazole as colorless prisms melting at 124–126° C. Yield 1.5 parts.

*Analysis.*—Calculated: C, 58.98%; H, 4.95%; N, 10.58%.
  Found: C, 59.05%; H, 4.99%; N, 10.48%.

EXAMPLE 13

To a mixture of 30 parts of ethanol and 10 parts of water are added 2.3 parts of 2,4-dichlorophenoxyacethydrazide, 1.6 parts of benzoylacetone and 0.3 part of 10% hydrochloric acid, and the mixture is allowed to react at 60° C. for 10 hours. After coooling, the separated crystals are recrystallized from ethanol to give 1-(2-,4-dichlorophenoxyacetyl)-3-methyl-5-phenylpyrazole as colorless needles melting at 118–119° C. Yield 1.6 parts.

*Analysis.*—Calculated: C, 59.86%; H, 3.90%; N, 7.75%.
  Found: C, 60.01%; H, 3.77%; N, 7.26%.

EXAMPLE 14

To a mixture of 50 parts of ethanol, 20 parts of water, and 10 parts of 10% hydrochloric acid are added 4.6 parts of 2,4-dichlorophenoxyacethydrazide and 3.4 parts of ethyl ethoxymethylenecyanoacetate, and the mixture is stirred at room temperature (20° to 30° C.) for 5 hours. The separated crystals are recrystallized from ethanol to give 1-(2-4,-dichlorophenoxyacetyl)-4-ethoxycarbonyl-5-aminopyrazole as colorless crystals melting at 162° C. Yield 2 parts.

*Analysis.*—Calculated: C, 46.95%; H, 3.65%; N, 12.01%.
  Found: C, 46.23%; H, 3.67%; N, 11.63%.

EXAMPLE 15

To a mixture of 30 parts of ethanol, 5 parts of water and 0.2 part of 10% hydrochloric acid are added 2.1 parts of 4-chloro-2-methylphenoxyacethydrazide and 1 part of acetylacetone. The mixture is heated at 60° C. for 3 hours. After cooling, the separated crystals are recrystallized from ethanol to give 1-(2-methyl-4-chlorophenoxyacetyl)-3,5-dimethylpyrazole as colorless prisms melting at 137.5–138.5° C. Yield 2 parts.

Analysis.—Calculated: C, 60.32%; H, 5.42%; N, 10.05%. Found: C, 60.33%; H, 5.53%; N, 10.32%.

EXAMPLE 16

To a mixture of 35 parts of ethanol, 5 parts of water, and 0.3 part of 10% hydrochloric acid are added 2.7 parts of 2,4,5-trichlorophenoxyacethydrazide, 1 part of acetylacetone, and the mixture is refluxed for 1.5 hours. After cooling, the separated crystals are recrystallized from ethanol to give 1-(2,4,5-trichlorophenoxyacetyl)-3,5-dimethylpyrazole as colorless melting at 177–178° C. Yield 1.9 parts.

Analysis.—Calculated: C, 46.76%; H, 3.32%; N, 8.39%. Found: C, 46.74%; H, 3.35%; N, 8.37%.

EXAMPLE 17

To a mixture of 40 parts of ethanol, 10 parts of water and 1 part of 10% hydrochloric acid are added 2.6 parts of 2,4-dinitrophenoxyacethydrazide and 1 part of acetylacetone, and the mixture is heated at 60° C. for 1 hour. After cooling, the separated crystals are recrystallized from ethanol to give 1-(2,4-dinitrophenoxyacetyl)-3,5-dimethylpyrazole as pale yellowish prisms melting at 161–162° C. Yield 2 parts.

Analysis.—Calculated: C, 48.75% H, 3.78%; N, 17.50%. Found: C, 48.91%; H, 3.94%; N, 17.57%.

EXAMPLE 18

To a mixture of 35 parts of ethanol, 5 parts of water and 0.3 part of 10% hydrochloric acid are added 2 parts of 4-chlorophenoxyacethydrazide and 1.3 part of 3-chloro-n-pentane-2,4-dione, and the mixture is heated at 60° C. for 1.5 hours. After cooling, the separated crystals are recrystallized from ethanol to give 1-(4-chlorophenoxyacetyl)-3,5-dimethyl-4-chloropyrazole as colorless plates melting at 151–153° C. Yield 1.3 parts.

Analysis.—Calculated: C, 52.19%; H, 4.04%; N, 9.36%. Found: C, 51.69%; H, 3.85%; N, 8.84%.

EXAMPLE 19

To a mixture of 40 parts of ethanol, 10 parts of water and 0.5 part of 10% hydrochloric acid are added 2.3 parts of 2,4-dichlorophenoxyacethydrazide and 1.3 parts of 3-chloro-n-pentane-2,4-dione, and the mixture is refluxed for 1 hour. After cooling, the separated crystals are recrystallized from ethanol to give 1-(2,4-dichlorophenoxyacetyl)-3,5-dimethyl-4-chloropyrazole as colorless needles melting at 127–128° C. Yield 2 parts.

Analysis.—Calculated: C, 46.76%; H, 3.32%; N, 8.39%. Found: C, 46.88%; H, 3.37%; N, 8.16%.

EXAMPLE 20

To a mixture of 35 parts of ethanol, 15 parts of water and 0.7 part of 10% hydrochloric acid are added 2.7 parts of 2,4,5-trichlorophenoxyacethydrazide and 1.3 parts of 3-chloro-n-pentane-2,4-dione. The mixture is heated at 60° C. for 2 hours. After cooling, the separated crystals are recrystallized from ethanol to give 1-(2,4,5-trichlorophenoxyacetyl)-3,5-dimethyl-4-chloropyrazole as colorless scales melting at 136.5–138° C. Yield 2 parts.

Analysis.—Calculated: C, 42.42%; H, 2.74%; N, 7.61%. Found: C, 42.28%; H, 2.84%; N, 7.64%.

EXAMPLE 21

To a mixture of 40 parts of ethanol, 10 parts of water and 0.5 part of 10% hydrochloric acid are added 2 parts of 2-chlorophenoxyacethydrazide and 1.5 parts of 3-nitro-n-pentane-2,4,-dione, and the mixture is refluxed for 1 hour. After cooling, the separated crystals are recrystallized from ethanol to give 1-(2-chlorophenoxyacetyl)-3,5-dimethyl-4-nitropyrazole as colorless prisms melting at 192–193° C. Yield 1.3 parts.

Analysis.—Calculated: C, 50.41%; H, 3.90%, N, 13.57%. Found: C, 50.40%; H, 4.22%; N, 13.55%.

EXAMPLE 22

To a mixture of 40 parts of ethanol, 10 parts of water and 0.5 part of 10% hydrochloric acid are added 2 parts of 4-chlorophenoxyacethydrazide and 1.5 parts of 3-nitro-n-pentane-2,4-dione, and the mixture is refluxed for 1 hour. After cooling, the separated crystals are recrystallized from ethanol to give 1-(4-chlorophenoxyacetyl)-3,5-dimethyl-4-nitropyrazole as colorless needles melting at 184–186° C. Yield 1.4 parts.

Analysis.—Calculated: C, 50.41%; H, 3.90%; N, 13.59%. Found: C, 50.65%; H, 4.03%; N, 14.03%.

EXAMPLE 23

To a mixture of 35 parts of ethanol, 5 parts of water and 0.5 part of 10% hydrochloric acid are added 2.3 parts of 2,4-dichlorophenoxyacethydrazide and 1.5 parts of 3-nitro-n-pentane-2,4-dione, and the mixture is refluxed for 2 hours. After cooling, the separated crystals are recrystallized from ethanol to give 1-(2,4-dichlorophenoxyacetyl)-3,5-dimethyl-4-nitropyrazole as colorless prisms melting at 161–162° C. Yield 1.7 parts.

Analysis.—Calculated: C, 45.37%; H, 3.22%; N, 12.21%. Found: C, 45.54%; H, 3.32%; N, 12.26%.

EXAMPLE 24

To a solution of 1.5 parts of 3,5-dimethylpyrazole in 5 parts of pyridine, is dropwise added 2,4-dichlorophenoxyacetylchloride. After the mixture is stirred for 1 hour, 40 parts of water are added. The separated crystals are recrystallized from acetone-water to give 1-(2,4-dichlorophenoxyacetyl)-3,5-dimethylpyrazole as colorless needles melting at 132–134° C. Yield 2.4 parts.

Analysis.—Calculated: C, 52.19%; H, 4.04%; N, 9.3%. Found: C, 52.06%; H, 4.01%; N, 9.63%.

EXAMPLE 25

A mixture of 1.5 parts of 3,5-dimethylpyrazole and 3 parts of 4-chlorophenoxyacetylchloride is heated at 100° C. for 2 hours. After cooling, 40 parts of water is added to the reaction mixture. The separated crystals are recrystallized from acetone-water to give 1-(4-chlorophenoxyacetyl)-3,5-dimethylpyrazole as colorless scales melting at 112–113° C. Yield 2.8 parts.

Analysis.—Calculated: C, 58.98%; H, 4.95%; N, 10.58%. Found: C, 59.14%; H, 4.82%; N, 10.32%.

EXAMPLE 26

To a solution of 1.6 parts of 3,5-dimethyl-4-chloropyrazole in 5 parts of pyridine, is added dropwise a solution of 3 parts of 2,4,5-trichlorophenoxyacetylchloride in 5 parts of acetone. After one hour's stirring, 100 parts of water are added to the reaction mixture. The separated crystals are recrystallized from acetone to give 1-(2,4,5-trichlorophenoxyacetyl)-3,5-dimethyl-4-chloropyrazole as colorless scales melting at 136.5–138° C. Yield 3.2 parts.

Analysis.—Calculated: C, 42.42%; H, 2.74%; N, 7.61%. Found: C, 42.28%; H, 2.84%; N, 7.64%.

EXAMPLE 27

To 50 parts of ethanol containing 1 part of 10% hydrochloric acid are added 2.3 parts of 2-hydroxymethyl-4-chlorophenoxyacethydrazide and 1 part of acetylacetone. The reaction mixture is heated at 50° C. for 1 hour. After cooling, the separated solid is recrystallized from dimethylformamide-ethanol to give 1-(2-hydroxymethyl-4-chlorophenoxyacetyl)-3,5-dimethylpyrazole as colorless needles melting at 133° C. Yield 2.4 parts.

*Analysis.*—Calculated: C, 57.06%; H, 5.14%; N, 9.51%. Found: C, 56.89%; H, 4.96%; N, 9.43%.

The following compounds can be synthesized in similar manner.

TABLE

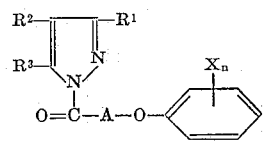

[Remarks for "solvent for recrystallization": DMF=dimethylformamide]

| $R^1$ | $R^2$ | $R^3$ | A | $X_n$ | Melting point (° C.) | Solvent for recrystallization | Appearance of crystals |
|---|---|---|---|---|---|---|---|
| $CH_3-$ | Br | $CH_3-$ | $-CH_2-$ | 2-Cl | 157–158 | Acetone | Colorless needles. |
| $CH_3-$ | H | $C_2H_5O-$ | $-CH_2-$ | 2-Cl | 98–100 | do | Colorless prisms. |
| $CH_3-$ | Cl | $C_2H_5O-$ | $-CH_2-$ | 2-Cl | 141–142 | do | Do. |
| $CH_3-$ | Br | $C_2H_5O-$ | $-CH_2-$ | 2-Cl | 133–134 | do | Do. |
| $CH_3-$ | H | $C_6H_5-$ | $-CH_2-$ | 2-Cl | 138–138.5 | do | Do. |
| $CH_3-$ | Cl | $C_6H_5-$ | $-CH_2-$ | 2-Cl | 185–186 | DMF | Do. |
| $CH_3-$ | Br | $C_6H_5-$ | $-CH_2-$ | 2-Cl | 190–191 | DMF | Do. |
| $CH_3-$ | H | $CH_3-$ | $-CH_2-$ | 3-Cl | 100–101 | Acetone | Do. |
| $CH_3-$ | $-NO_2$ | $CH_3-$ | $-CH_2-$ | 3-Cl | 164–166 | DMF | Do. |
| $CH_3-$ | Cl | $CH_3-$ | $-CH_2-$ | 3-Cl | 108–109 | Acetone | Do. |
| $CH_3-$ | Br | $CH_3-$ | $-CH_2-$ | 3-Cl | 120–121 | do | Do. |
| $CH_3-$ | H | $C_2H_5O-$ | $-CH_2-$ | 3-Cl | 101 | do | Colorless crystals. |
| $CH_3-$ | Cl | $C_2H_5O-$ | $-CH_2-$ | 3-Cl | 77 | do | Colorless prisms. |
| $CH_3-$ | Br | $C_2H_5O-$ | $-CH_2-$ | 3-Cl | 78–80 | Ligroin | Do. |
| $CH_3-$ | H | $C_6H_5-$ | $-CH_2-$ | 3-Cl | 114–115 | Acetone | Do. |
| $CH_3-$ | Cl | $C_6H_5-$ | $-CH_2-$ | 3-Cl | 108–109 | do | Do. |
| $CH_3-$ | Br | $C_6H_5-$ | $-CH_2-$ | 3-Cl | 97–99 | do | Do. |
| $CH_3-$ | H | $C_2H_5O-$ | $-CH_2-$ | 4-Cl | 101–103 | do | Colorless needles. |
| $CH_3-$ | Cl | $C_2H_5O-$ | $-CH_2-$ | 4-Cl | 85–87 | do | Do. |
| $CH_3-$ | Br | $C_2H_5O-$ | $-CH_2-$ | 4-Cl | 111–113 | do | Do. |
| $CH_3-$ | H | $C_6H_5-$ | $-CH_2-$ | 4-Cl | 121–122 | do | Colorless prisms. |
| $CH_3-$ | Cl | $C_6H_5-$ | $-CH_2-$ | 4-Cl | 109–110 | do | Do. |
| $CH_3-$ | Br | $C_6H_5-$ | $-CH_2-$ | 4-Cl | 102–104 | do | Do. |
| $CH_3-$ | $-NO_2$ | $CH_3-$ | $-CH_2-$ | 2-$CH_3$-4-Cl | 172–173 | do | Do. |
| $CH_3-$ | Cl | $CH_3-$ | $-CH_2-$ | 2-$CH_3$-4-Cl | 113–114 | do | Do. |
| $CH_3-$ | Br | $CH_3-$ | $-CH_2-$ | 2-$CH_3$-4-Cl | 121–122 | do | Do. |
| $CH_3-$ | H | $C_2H_5O-$ | $-CH_2-$ | 2-$CH_3$-4-Cl | 105 | do | Do. |
| $CH_3-$ | Cl | $C_2H_5O-$ | $-CH_2-$ | 2-$CH_3$-4-Cl | 130–131.5 | do | Do. |
| $CH_3-$ | Br | $C_2H_5O-$ | $-CH_2-$ | 2-$CH_3$-4-Cl | 137–137.5 | do | Do. |
| $CH_3-$ | H | $C_6H_5-$ | $-CH_2-$ | 2-$CH_3$-4-Cl | 125–125.5 | do | Do. |
| $CH_3-$ | Cl | $C_6H_5-$ | $-CH_2-$ | 2-$CH_3$-4-Cl | 126–128 | do | Do. |
| $CH_3-$ | Br | $C_6H_5-$ | $-CH_2-$ | 2-$CH_3$-4-Cl | 140–142 | do | Do. |
| $CH_3-$ | Br | $CH_3-$ | $-CH_2-$ | 2,4-di-Cl | 135–137 | do | Colorless crystals. |
| $CH_3-$ | H | $C_2H_5O-$ | $-CH_2-$ | 2,4-di-Cl | 107–108 | do | Colorless prisms. |
| $CH_3-$ | Cl | $C_2H_5O-$ | $-CH_2-$ | 2,4-di-Cl | 92–94 | do | Do. |
| $CH_3-$ | Br | $C_2H_5O-$ | $-CH_2-$ | 2,4-di-Cl | 104–106 | do | Do. |
| $CH_3-$ | Cl | $C_6H_5-$ | $-CH_2-$ | 2,4-di-Cl | 109–110 | do | Colorless needles. |
| $CH_3-$ | Br | $C_6H_5-$ | $-CH_2-$ | 2,4-di-Cl | 122.5–124 | do | Do. |
| $CH_3-$ | H | $CH_3-$ | $-CH(CH_3)-$ | 2,4-di-Cl | 108 | do | Colorless prisms. |
| $CH_3-$ | $-NO_2$ | $CH_3-$ | $-CH(CH_3)-$ | 2,4-di-Cl | 97–99 | n-Hexane | Colorless crystals. |
| $CH_3-$ | Cl | $CH_3-$ | $-CH(CH_3)-$ | 2,4-di-Cl | 100–101 | Acetone | Colorless needles. |
| $CH_3-$ | Br | $CH_3-$ | $-CH(CH_3)-$ | 2,4-di-Cl | 110 | do | Colorless prisms. |
| $CH_3-$ | H | $C_2H_5O-$ | $-CH(CH_3)-$ | 2,4-di-Cl | 73–74 | n-Hexane | Colorless needles. |
| $CH_3-$ | Cl | $C_2H_5O-$ | $-CH(CH_3)-$ | 2,4-di-Cl | 65 | Acetone | Colorless prisms. |
| $CH_3-$ | Br | $C_2H_5O-$ | $-CH(CH_3)-$ | 2,4-di-Cl | 80–82 | do | Do. |
| $CH_3-$ | H | $C_6H_5-$ | $-CH(CH_3)-$ | 2,4-di-Cl | 109–110 | do | Colorless needles. |
| $CH_3-$ | Cl | $C_6H_5-$ | $-CH(CH_3)-$ | 2,4-di-Cl | 129–130 | do | Do. |
| $CH_3-$ | Br | $C_6H_5$ | $-CH(CH_3)-$ | 2,4-di-Cl | 132–132.5 | do | Do. |
| $CH_3-$ | H | $CH_3-$ | $-CH_2-$ | 2,5-di-Cl | 112–113 | do | Colorless prisms. |
| $CH_3-$ | $-NO_2$ | $CH_3-$ | $-CH_2-$ | 2,5-di-Cl | 160–161 | do | Do. |
| $CH_3-$ | Cl | $CH_3-$ | $-CH_2-$ | 2,5-di-Cl | 150–151 | do | Do. |
| $CH_3-$ | Br | $CH_3-$ | $-CH_2-$ | 2,5-di-Cl | 157–158 | do | Do. |
| $CH_3-$ | H | $C_2H_5O-$ | $-CH_2-$ | 2,5-di-Cl | 121–122 | Acetone+Methanol | Do. |
| $CH_3-$ | Cl | $C_2H_5O-$ | $-CH_2-$ | 2,5-di-Cl | 115–116 | Acetone | Do. |
| $CH_3-$ | Br | $C_2H_5O-$ | $-CH_2-$ | 2,5-di-Cl | 91–92 | do | Do. |
| $CH_3-$ | H | $C_6H_5-$ | $-CH_2-$ | 2,5-di-Cl | 120–121 | do | Do. |
| $CH_3-$ | Cl | $C_6H_5-$ | $-CH_2-$ | 2,5-di-Cl | 116–117 | do | Do. |
| $CH_3-$ | Br | $C_6H_5-$ | $-CH_2-$ | 2,5-di-Cl | 113–115 | do | Do. |
| $CH_3-$ | H | $CH_3-$ | $-CH_2-$ | 2,6-di-Cl | 145 | do | Do. |
| $CH_3-$ | $-NO_2$ | $CH_3-$ | $-CH_2-$ | 2,6-di-Cl | 177–179 | DMF+Acetone | Do. |
| $CH_3-$ | Cl | $CH_3-$ | $-CH_2-$ | 2,6-di-Cl | 148–149 | do | Do. |
| $CH_3-$ | Br | $CH_3-$ | $-CH_2-$ | 2,6-di-Cl | 145–146 | do | Do. |
| $CH_3-$ | H | $C_2H_5O-$ | $-CH_2-$ | 2,6-di-Cl | 81–83 | Acetone | Do. |
| $CH_3-$ | Cl | $C_2H_5O-$ | $-CH_2-$ | 2,6-di-Cl | 122–124 | do | Do. |
| $CH_3-$ | Br | $C_2H_5O-$ | $-CH_2-$ | 2,6-di-Cl | 147–148 | do | Colorless needles. |
| $CH_3-$ | H | $C_6H_5-$ | $-CH_2-$ | 2,6-di-Cl | 133–134 | do | Colorless crystals. |
| $CH_3-$ | Cl | $C_6H_5-$ | $-CH_2-$ | 2,6-di-Cl | 160–161 | do | Colorless needles. |
| $CH_3-$ | Br | $C_6H_5-$ | $-CH_2-$ | 2,6-di-Cl | 162–163 | do | Do. |
| $CH_3-$ | H | $CH_3-$ | $-CH_2-$ | 2,4,5-tri-Cl | 160 | do | Do. |
| $CH_3-$ | $-NO_2$ | $CH_3-$ | $-CH_2-$ | 2,4,5-tri-Cl | 154–154.5 | do | Do. |
| $CH_3-$ | Br | $CH_3-$ | $-CH_2-$ | 2,4,5-tri-Cl | 123–124 | do | Colorless crystals. |
| $CH_3-$ | H | $C_2H_5O-$ | $-CH_2-$ | 2,4,5-tri-Cl | 107–108 | do | Do. |
| $CH_3-$ | Cl | $C_2H_5O-$ | $-CH_2-$ | 2,4,5-tri-Cl | 120 | do | Colorless prisms. |
| $CH_3-$ | Br | $C_2H_5O-$ | $-CH_2-$ | 2,4,5-tri-Cl | 131–133 | do | Colorless prisms. |
| $CH_3-$ | H | $C_6H_5-$ | $-CH_2-$ | 2,4,5-tri-Cl | 159.5–160.5 | do | Colorless prisms. |
| $CH_3-$ | Cl | $C_6H_5-$ | $-CH_2-$ | 2,4,5-tri-Cl | 157–158 | do | Do. |
| $CH_3-$ | Br | $C_6H_5-$ | $-CH_2-$ | 2,4,5-tri-Cl | 130–131 | do | Do. |
| $CH_3-$ | H | $CH_3-$ | $-CH_2-$ | 2-$NO_2-$ | 184–185 | DMF+Acetone | Colorless needles. |
| $CH_3-$ | $-NO_2$ | $CH_3-$ | $-CH_2-$ | 2-$NO_2-$ | 139–140 | Acetone | Colorless prisms. |
| $CH_3-$ | Cl | $CH_3-$ | $-CH_2-$ | 2-$NO_2-$ | 153–154 | do | Do. |
| $CH_3-$ | Br | $CH_3-$ | $-CH_2-$ | 2-$NO_2-$ | 147–148 | DMF+Acetone | Colorless needles. |

TABLE.—Continued

| R¹ | R² | R³ | A | X_n | Melting point (°C.) | Solvent for recrystallization | Appearance of crystals |
|---|---|---|---|---|---|---|---|
| $CH_3-$ | Cl | $C_6H_5-$ | $-CH_2-$ | 2-NO*— | 169–170 | -----do----- | Do. |
| $CH_3-$ | Br | $C_6H_5-$ | $-CH_2-$ | 2-NO_2— | 176–177 | -----do----- | Do. |
| $CH_3-$ | H | $C_2H_5O-$ | $-CH_2-$ | 2-NO_2— | 109–111 | Acetone | Colorless crystals. |
| $CH_3-$ | H | $CH_3-$ | $-CH_2-$ | 3-NO_2— | 137–137.5 | -----do----- | Colorless prisms. |
| $CH_3-$ | $-NO_2$ | $CH_3-$ | $-CH_2-$ | 3-NO_2— | 148–149 | -----do----- | Do. |
| $CH_3-$ | Cl | $CH_3-$ | $-CH_2-$ | 3-NO_2— | 155–156 | DMF+Acetone | Do. |
| $CH_3-$ | Br | $CH_3-$ | $-CH_2-$ | 3-NO_2— | 167–168 | -----do----- | Colorless crystals. |
| $CH_3-$ | H | $C_2H_5O-$ | $-CH_2-$ | 3-NO_2— | 109–110 | Acetone | Colorless prisms. |
| $CH_3-$ | H | $C_6H_5-$ | $-CH_2-$ | 3-NO_2— | 139–140 | DMF+Acetone | Do. |
| $CH_3-$ | Cl | $C_6H_5-$ | $-CH_2-$ | 3-NO_2— | 131–132 | Acetone | Do. |
| $CH_3-$ | Br | $C_6H_5-$ | $-CH_2-$ | 3-NO_2— | 115–117 | -----do----- | Colorless crystals. |
| $CH_3-$ | H | $CH_3-$ | $-CH_2-$ | 4-NO_2 | 168–169 | -----do----- | Colorless scales. |
| $CH_3-$ | $-NO_2$ | $CH_3-$ | $-CH_2-$ | 4-NO_2 | 160 | -----do----- | Colorless crystals. |
| $CH_3-$ | Cl | $CH_3-$ | $-CH_2-$ | 4-NO_2 | 176–178 | -----do----- | Colorless prisms. |
| $CH_3-$ | Br | $CH_3-$ | $-CH_2-$ | 4-NO_2 | 190–191 | -----do----- | Do. |
| $CH_3-$ | H | $C_6H_5-$ | $-CH_2-$ | 4-NO_2 | 220–222 | -----do----- | Colorless plates. |
| $CH_3-$ | Cl | $C_6H_5-$ | $-CH_2-$ | 4-NO_2 | 164–165 | -----do----- | Colorless needles. |
| $CH_3-$ | Br | $C_6H_5-$ | $-CH_2-$ | 4-NO_2 | 149–151 | -----do----- | Do. |
| $CH_3-$ | H | $CH_3-$ | $-CH_2-$ | 2,3,4,6-tetra-Cl | 159–160 | DMF+Acetone | Colorless crystals. |
| $CH_3-$ | Cl | $CH_3-$ | $-CH_2-$ | 2,3,4,6-tetra-Cl | 178–179 | -----do----- | Colorless prisms. |
| $CH_3-$ | H | $C_6H_5-$ | $-CH_2-$ | 2,3,4,6-tetra-Cl | 146–147 | -----do----- | Do. |
| $CH_3-$ | H | $CH_3-$ | $-CH_2-$ | 2,3,4,5,6-penta-Cl | 180–181 | DMF | Colorless crystals. |
| $CH_3-$ | Cl | $CH_3-$ | $-CH_2-$ | 2,3,4,5,6-penta-Cl | 195 | DMF | Do. |
| H | $-(CH_2)_4-$ | | $-CH_2-$ | 4-Cl | 120 | Acetone | Do. |
| H | $-CH=CH-CH=CH-$ | | $-CH_2-$ | 4-Cl | 129–131 | -----do----- | Do. |
| H | $-CH=CH-CH=CH-$ | | $-CH_2-$ | 2,4-di-Cl | 135 | -----do----- | Colorless needles. |
| H | $-CH=CH-CH=CH-$ | | $-CH_2-$ | 2,4,5-tri-Cl | 210–212 | -----do----- | Colorless crystals. |
| H | $-CH=CH-CH=CH-$ | | $-CH(CH_3)-$ | 2,4-di-Cl | 81–82 | -----do----- | Colorless needles. |

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

Having thus disclosed the invention, what is claimed is:
1. 1-(2-chlorophenoxyacetyl)-3,5-dimethyl-4-chloropyrazole.
2. 1-(3-chlorophenoxyacetyl)-3,5-dimethyl-4-chloropyrazole.
3. 1-(4-chlorophenoxyacetyl)-3,5-dimethyl-4-chloropyrazole.
4. 1-(2-methyl-4-chlorophenoxyacetyl)-3,5-dimethyl-4-chloropyrazole.
5. 1-(2-methyl-4-chlorophenoxyacetyl)-3,5-dimethyl-4-bromopyrazole.
6. 1-(2,4-dichlorophenoxyacetyl)-3,5-dimethyl-4-chloropyrazole.
7. 1-(2,4-dichlorophenoxyacetyl)-3,5-dimethyl-4-bromopyrazole.
8. 1-[α-(2,4-dichlorophenoxy)propionyl]-3,5-dimethyl-4-chloropyrazole.
9. 1-[α-(2,4-dichlorophenoxy)propionyl]-3,5-dimethyl-4-bromopyrazole.
10. 1-(2,5-dichlorophenoxyacetyl)-3,5-dimethyl-4-chloropyrazole.
11. 1-(2,6-dichlorophenoxyacetyl)-3,5-dimethyl-4-chloropyrazole.
12. 1-(2,4,5-trichlorophenoxyacetyl)-3,5-dimethyl-4-chloropyrazole.
13. 1-(2,4,5-trichlorophenoxyacetyl)-3,5-dimethyl-4-bromopyrazole.
14. 1-(2-nitrophenoxyacetyl)-3,5-dimethyl-4-chloropyrazole.
15. 1-(3-nitrophenoxyacetyl)-3,5-dimethyl-4-chloropyrazole.
16. 1-(4-nitrophenoxyacetyl)-3,5-dimethyl-4-chloropyrazole.
17. 1-(2,3,4,6-tetrachlorophenoxyacetyl)-3,5-dimethyl-4-chloropyrazole.
18. 1-(2,3,4,5,6-pentachlorophenoxyacetyl)3,5-dimethyl-4-chloropyrazole.

No references cited.

WALTER A. MODANCE, *Primary Examiner.*

NATALIE TROUSOF, *Assistant Examiner.*